United States Patent
Rustad et al.

(10) Patent No.: US 12,320,777 B2
(45) Date of Patent: Jun. 3, 2025

(54) OILFIELD PRODUCTION PARTICULATE MONITORING ASSEMBLY

(71) Applicant: OneSubsea IP UK Limited, London (GB)

(72) Inventors: Rolf Rustad, Sandsli (NO); Jean Francois Noel, Sandsli (NO); Emmanuel Lagrand, Sandsli (NO); Erlend Bjoerndal, Sandsli (NO); Alexandre Lupeau, Sandsli (NO); Cheng-Gang Xie, Singapore (SG)

(73) Assignee: OneSubsea IP UK Limited, London (GB)

( * ) Notice: Subject to any disclaimer, the term of this patent is extended or adjusted under 35 U.S.C. 154(b) by 43 days.

(21) Appl. No.: 16/798,485

(22) Filed: Feb. 24, 2020

(65) Prior Publication Data
US 2020/0284765 A1 Sep. 10, 2020

Related U.S. Application Data

(60) Provisional application No. 62/808,965, filed on Feb. 22, 2019.

(51) Int. Cl.
*G01N 29/036* (2006.01)
*E21B 43/34* (2006.01)
(Continued)

(52) U.S. Cl.
CPC ........... *G01N 29/036* (2013.01); *E21B 43/35* (2020.05); *E21B 47/00* (2013.01); *E21B 49/005* (2013.01);
(Continued)

(58) Field of Classification Search
CPC .... G01N 29/036; G01N 29/222; G01N 29/32; G01N 2291/02416; G01N 15/06;
(Continued)

(56) References Cited

U.S. PATENT DOCUMENTS 3,906,780 A 9/1975 Baldwin
4,532,812 A 8/1985 Birchak
(Continued)

FOREIGN PATENT DOCUMENTS

CN 102879044 A 1/2013
CN 107366532 A 11/2017
(Continued)

OTHER PUBLICATIONS

Extended Search Report received in European Patent Application No. 20159085.8 dated Jul. 10, 2020, 8 pages.
(Continued)

*Primary Examiner* — Xin Y Zhong
(74) *Attorney, Agent, or Firm* — Jeffrey D. Frantz

(57) ABSTRACT

An assembly for monitoring particulate in a production fluid. The assembly supports routing of production fluid through a restriction and to a strategically located detector downstream and adjacent the restriction. Further, the detector incorporates acoustic attenuating features to provide a tailored detection focused on acoustics directly from particulate in the fluid. These features may include the use of a transducer housing with a ribbed profile to achieve the attenuation. Although, other types of attenuating techniques may be employed.

15 Claims, 5 Drawing Sheets

(51) Int. Cl.
  *E21B 47/00* (2012.01)
  *E21B 49/00* (2006.01)
  *G01F 1/44* (2006.01)
  *G01N 29/22* (2006.01)
  *G01N 29/32* (2006.01)
  *E21B 43/36* (2006.01)

(52) U.S. Cl.
  CPC ............ *G01F 1/44* (2013.01); *G01N 29/222* (2013.01); *G01N 29/32* (2013.01); *E21B 43/36* (2013.01); *G01N 2291/02416* (2013.01)

(58) Field of Classification Search
  CPC . G01N 2015/0053; G01N 2291/02408; G01N 2291/2634; G01N 29/046; G01N 29/14; E21B 43/35; E21B 47/00; E21B 49/005; E21B 43/36; E21B 43/12; E21B 47/01; E21B 47/107; G01F 1/44; G01F 1/74; G10K 11/16; G01H 3/12; H04R 1/028
  See application file for complete search history.

(56) References Cited

U.S. PATENT DOCUMENTS

| | | | |
|---|---|---|---|
| 4,893,496 A | 1/1990 | Bau et al. | |
| 4,949,317 A | 8/1990 | McQuitty et al. | |
| 5,275,060 A | 1/1994 | Lynnworth | |
| 5,955,677 A | 9/1999 | Holliday | |
| 6,526,838 B1 | 3/2003 | Froelich et al. | |
| 6,837,098 B2 | 1/2005 | Gysling et al. | |
| 7,503,217 B2 | 3/2009 | Johansen | |
| 7,578,203 B2 | 8/2009 | Andersen et al. | |
| 8,225,665 B2 | 7/2012 | Geir et al. | |
| 9,803,976 B2 | 10/2017 | Simonetti et al. | |
| 2008/0084321 A1* | 4/2008 | Hatch | G01N 29/222 |
| | | | 340/603 |
| 2008/0306396 A1 | 12/2008 | Ariav et al. | |
| 2011/0080807 A1 | 4/2011 | Instanes et al. | |
| 2012/0048038 A1* | 3/2012 | Furlong | G01L 19/0007 |
| | | | 73/866.5 |
| 2012/0125121 A1* | 5/2012 | Gottlieb | G01F 1/665 |
| | | | 73/273 |
| 2015/0136842 A1 | 5/2015 | Allen et al. | |
| 2015/0184511 A1* | 7/2015 | Gordon | E21B 47/10 |
| | | | 73/152.23 |
| 2017/0328163 A1* | 11/2017 | Shirani | E21B 43/12 |
| 2018/0163528 A1 | 6/2018 | Smith et al. | |
| 2019/0033898 A1 | 1/2019 | Shah et al. | |
| 2020/0033174 A1 | 1/2020 | Nogueira et al. | |
| 2020/0271493 A1 | 8/2020 | Lagrand et al. | |
| 2020/0284765 A1 | 9/2020 | Rustad et al. | |

FOREIGN PATENT DOCUMENTS

| | | |
|---|---|---|
| EP | 1192457 B1 | 1/2013 |
| EP | 3376177 A1 | 9/2018 |
| GB | 2399637 A | 9/2004 |
| GB | 2431993 A | 5/2007 |
| GB | 2457663 A | 8/2009 |
| GB | 2537654 A | 10/2016 |
| NO | 301948 B1 | 12/1997 |
| NO | 325153 B1 | 2/2008 |
| NO | 20150489 A1 | 10/2016 |
| WO | 0072000 A1 | 11/2000 |
| WO | 2005121770 A1 | 12/2005 |

OTHER PUBLICATIONS

Extended Search Report received in European Patent Application No. 20159081.7 dated Jul. 15, 2020, 9 pages.

Folkestad, T. et al., "Paper 17—Operating Experience with two Ultrasonic Gas meters in Series", 21st North Sea Flow Measurement Workshop 2003, 27 pages.

Communication Pursuant to Article 94(3) received in European Patent Application No. 20159081.7 dated Oct. 28, 2021, 6 pages.

Office Action issued in U.S. Appl. No. 16/798,479 dated Dec. 30, 2021, 24 pages.

Office Action issued in U.S. Appl. No. 16/798,479 dated Jan. 31, 2024, 12 pages.

\* cited by examiner

OILFIELD PRODUCTION PARTICULATE MONITORING ASSEMBLY

CROSS-REFERENCE TO RELATED APPLICATION

This application claims priority from and the benefit of U.S. Provisional Application Ser. No. 62/808,965, entitled "Improved Ultrasonic Sand Measurement Device for Subsea Applications", filed Feb. 22, 2019.

BACKGROUND

Exploring, drilling and completing hydrocarbon and other wells are generally complicated, time consuming and ultimately very expensive endeavors. This is particularly true in the case of offshore operations where expenses may grow exponentially long after the completion of the well. For example, subsequent routine intervention and maintenance may require considerable more time, effort and cost at the subsea oilfield.

In recognition of these potentially enormous expenses, added emphasis has been placed on well monitoring and maintenance throughout the life of the well. That is, placing added emphasis on increasing the life and productivity of a given well may help ensure that the well provides a healthy return on the significant investment involved in its completion. So, for example, it may be of benefit to cost effectively monitor well conditions such as pressure, temperature, or production fluid types and flow with an accurate flowmeter and in real-time where possible. Of course, what is cost effective may depend on the circumstances.

In the case of subsea operations, production fluids often present in a variety of different ways. For example, produced fluids may be multiphase in nature with a portion of the fluid being gas mixed with the oil-water liquid fraction of the fluid. Managing production of such fluids may be a challenge given the need to maintain a certain percentage of the fluid in liquid form in order to ensure maintaining effective production.

Similarly, production fluids may include a variety of particulate, most notably sand. That is, just as the production fluid is prone to be multiphase with perhaps a significant amount in gas fraction, it may also include a fair amount of particulate. Sand production, in particular is a common particulate that is produced with subsea production fluids.

Just as there is an ongoing need to monitor and manage multiphase fluid production in the subsea environment, there is also an ongoing need to monitor and manage particulate and sand production in order to ensure efficient production and minimize plugging and/or hardware erosion. For example, where sand is produced, an overall management system may need to be implemented in order to minimize, manage and deal with the particulate. This may range from the use of filters to more complex separator equipment. As with water production, failure to effectively manage the over-production of sand and other debris may lead to costly shutdowns in operations. By the same token, where effectively managed, a field may produce several thousands of barrels of sand per day and yet remain efficient and operational.

Of course, effectively managing the production of sand and other debris requires optimizing techniques for managing such production. This, in turn, requires the ability to monitor the amount, rate and other characteristics of the fluid production as it relates to the particulate. The more accurate the particulate monitoring, the more informed and effective the sand management operation.

Unfortunately, current techniques for ascertaining the production of sand and other troublesome debris rely on technology that is inherently limited in terms of accuracy. Specifically, a transducer is generally associated with a production line at a strategic location such as near or after a bend in the line. So, for example, acoustics generated by sand impacting the interior of the line at the bend as production flow passes the transducer may be detected by this transducer. In theory, this acoustic information may then be utilized to estimate the amount of sand in the flowing production fluid at any given point in time.

While the detected information may be of some value, its accuracy in terms of the actual amount of sand being produced with the production fluid is nearly impossible to determine. For example, the production of fluid, even absent any sand production is generally going to be responsible for some percentage of the detected acoustics at the transducer. How much may be a factor of production fluid properties, pump noise, the dimensions of the line, surrounding hardware and other operational characteristics. Once more, even acoustic detections which are directly attributable to sand and debris may not be entirely informative.

Consider the fact that the same sand particle may impact the interior of the line both upstream and downstream of the transducer location or not at all. Similarly, whether the impact is upstream or downstream of the transducer, the uncertainty of how far it was from the transducer is another variable. How to account for such random variability in impacts remains the subject of debate. Once more, factors such as acoustics through the line or pipe structure may depend on a host of added factors such as pipe thickness and material structure. All in all, while such information may be of value, operators continue to rely on a fair amount of unreliable acoustic data and additional guesswork when it comes to managing the production of sand and other debris. As a result, over-stressed separators and increased shutdowns remain likely occurrences for fields producing high amounts of sand.

SUMMARY

A particulate monitoring assembly is provided that is incorporated into a conduit coupled to a production line at an oilfield. The assembly includes a flow restriction in the conduit coupled to the production line to homogenize production fluid flowing therethrough. A detector at a downstream location from the flow restriction may be utilized to acquire acoustic data reflective of particulate in the production flow. In one embodiment, the detector includes a transducer within a housing with an acoustic noise mitigating component. This acoustic noise mitigating component may be a rib or a polymeric seal, potentially depending on intended subsea or topside usage.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain types of downhole hydrocarbon recovery operations. In particular, focus is drawn to monitoring techniques applied to permanent subsea installations for long term flow monitoring. However, tools and techniques detailed herein may be employed in a variety of other manners. For example, embodiments of flowmeters or particulate monitors as detailed herein may be configured for use "topside" at a surface-based oilfield. Indeed, such monitors may even be employed outside of the oilfield environment altogether. Regardless, so long as a monitor incorporates a restriction upstream of a targeted downstream detector location, appreciable benefit may be realized.

Figure 1A:
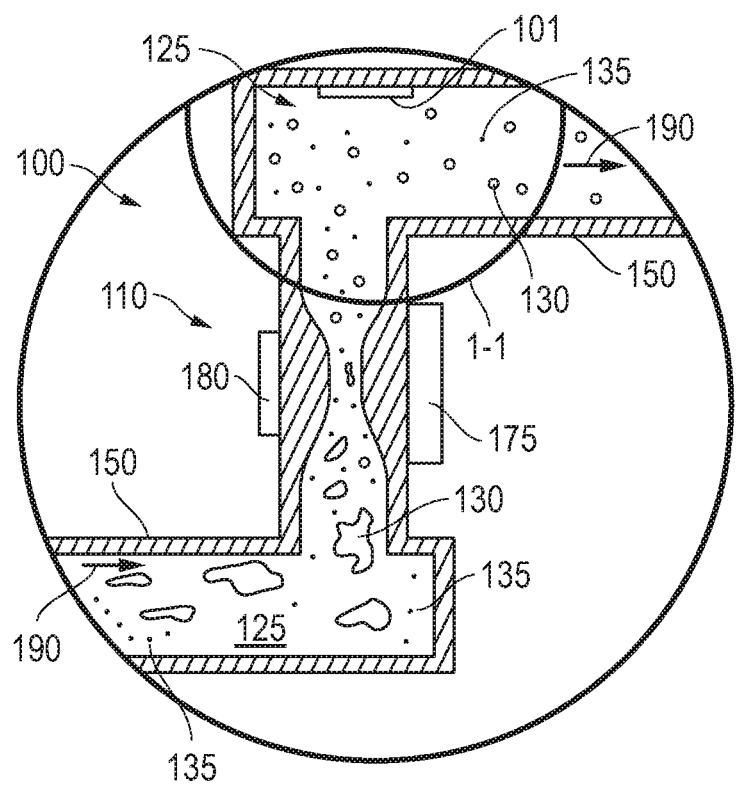
FIG. 1A is a cross-sectional schematic representation of an embodiment of an oilfield production particulate monitor.
Figure 4:
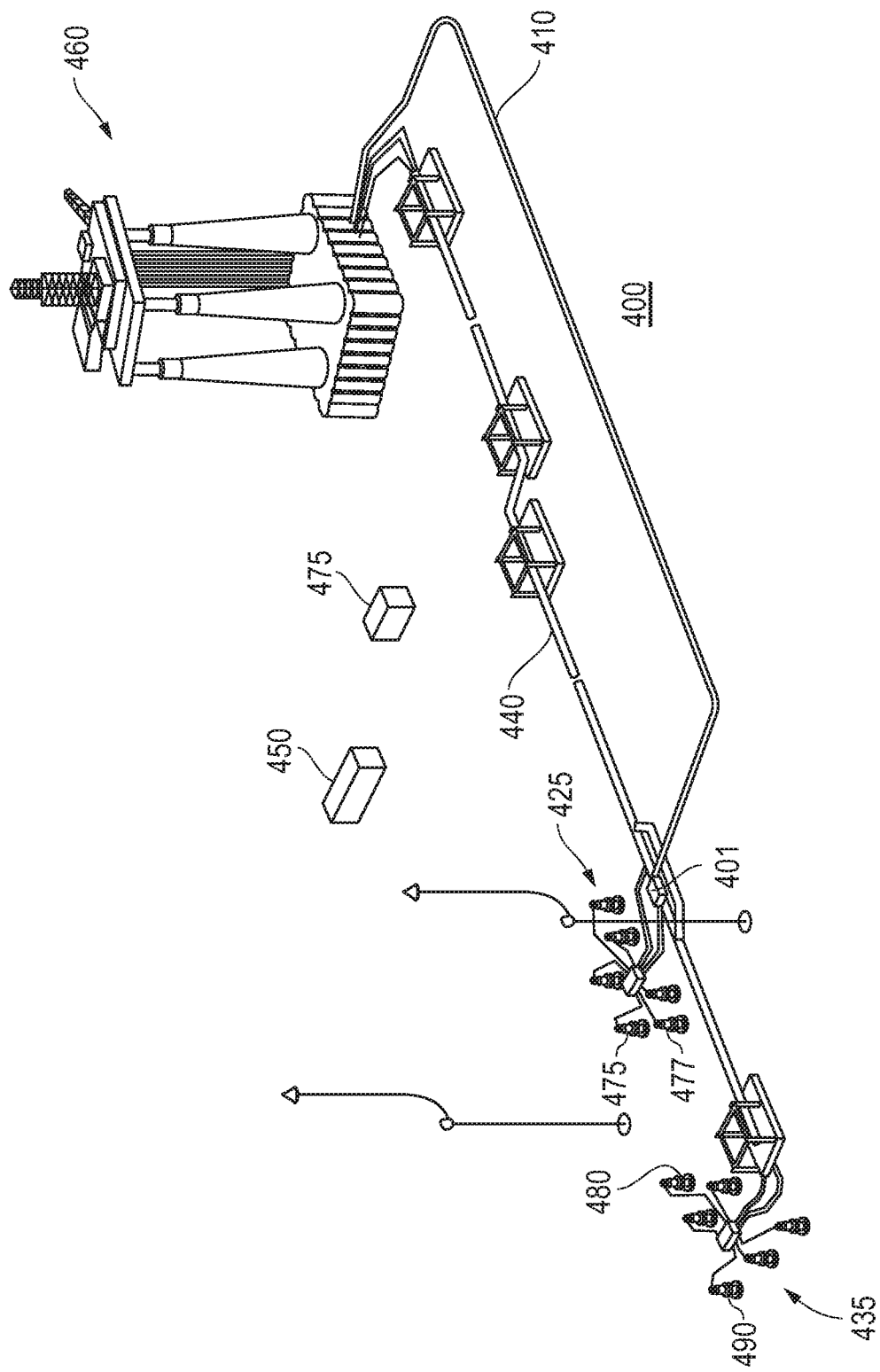
FIG. 4 is a perspective overview of a subsea oilfield with a unit housing the production particulate monitor of FIG. 3 for management of particulate production.

Referring now to FIG. 1A, with added reference to FIG. 4, a cross-sectional schematic representation of an embodiment of an oilfield production particulate monitor 100 is illustrated. The monitor 100 may be provided as a compact modular unit that includes a flowline 150 which may be fluidly coupled to a production line 440 as discussed further below. Thus, the flowline 150 may be constructed of steel and/or other similar metal alloys suitable for use in an oilfield environment 400. As with the rest of the production line 440, a flow of production fluid 125 is supported through the flowline 150 of the monitor 100.

In the embodiment shown, the production fluid 125 enters the monitor 100 assembly with various gas 130 and particulate 135 components, in addition to liquid. The gas fraction of the fluid 125 may present challenges to maintaining production flow and are often the focus of different production efforts. Similarly, as alluded to above, particulate 135 such as sand may present a challenge to production in terms of erosion, wear and strain to equipment such as the flowline 150, separators 450, 475, and other devices. Further, maintaining an efficient production flow may itself be hampered depending on the amount of particulate found in the fluid 125. Therefore, as suggested above, utilizing the monitor 100 to ascertain the amount of particulate 135 in the fluid 125 may be key to effectively managing the particulate 135 for sake of ongoing production.

As used herein, the term "particulate" 135 is meant to refer to solids such as sand, proppant and any other debris that is of a size sufficient to potentially have a notable effect on production efforts as established by the operator (e.g. based on likelihood of presenting production challenges when present in a given amount). So, for example, debris that is over about 25 microns in size may constitute "particulate" 135 and may be of particular concern when present in a volume of up to about 0.1% or more of the total production fluid 125, as predetermined by the operator. Of course, such numbers are provided here only for illustrative purposes as other particle sizing and amount may be of note, depending on operation parameters.

Continuing now with reference to FIG. 1A, the monitor 100 is equipped with unique features for ascertaining the amount of particulate 135 in the fluid 125. Specifically, as illustrated a restriction 110 in the flowline 150 is shown upstream of a target located detector 101. For example, the restriction 110 may be supplied in the form of a venturi flowmeter with associated emission 180 and detection 175 devices for ascertaining gas fraction, water cut and flow information. While this added benefit may be attained where a restriction 110 of this type is employed, even absent such devices 175, 180, the presence of the restriction 110 may serve to homogenize the fluid 125 flowing therethrough. In this regard, notice the smaller, less amorphous gas 130 and more homogenous, even distribution of the fluid constituents 130, 135 once the flow 190 has passed the restriction 110.

In addition to the emergence of the more homogenous state of the fluid 125 upon passing the restriction, a target located detector 101 is strategically positioned after the restriction 110 in the immediate presence of the homogenized fluid 125. In the embodiment illustrated this constitutes the placement of the detector 101 at a location that is substantially perpendicular to the orientation of the flow 190 passing through the restriction 110. While this may enhance particle detection at the detector 101, such positioning is not required. However, even where not oriented in such a perpendicular manner, the detector 101 is likely within a few inches of the restriction 110 to better ensure homogenization of the fluid 125 at the detector location. From a size and dimensional standpoint, recall that the overall assembly 100 is likely provided as a manually transportable, compact modular unit. Regardless, the combination of this detector 101 location relative the restriction 110 in combination with the effect of the restriction 110 itself may support enhanced accuracy of particulate detection as discussed further below. Ultimately, this may afford improved debris and sand management for the benefit of production operations.

Figure 1B:
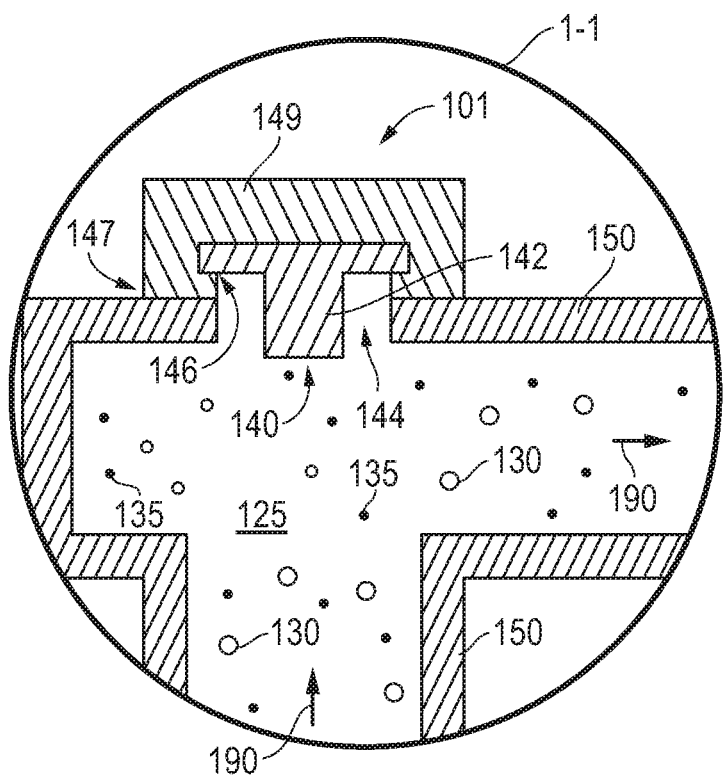
FIG. 1B is an enlarged detailed view of a target detector location of the monitor downstream of a restriction taken from 1-1 of FIG. 1A.

With added reference to FIG. 1B, alternative or added measures, apart from perpendicular detector orientation, may be taken to increase accuracy of detections. For example, in one embodiment, the face 140 of the detector 101 is in line with a central axis of flow through the restriction 110. In another embodiment, this face 140 is of a width that is less than about 25% that of the inner diameter of the flowline 150. For example, in one embodiment, the flowline 150 is of an inner diameter of about 10 cm whereas the width of the face 140 is limited to about 2 cm. Thus, a finite sampling area is provided for sake of improved accuracy.

Continuing now with specific reference to FIG. 1B, an enlarged and more detailed view of the detector location is illustrated as taken from 1-1 of FIG. 1A. In this view, the detector 101 is revealed as constituting multiple features. Specifically, the face 140 of the detector 101 is oriented to enhance contacting thereof by particulate 135 as alluded to above. Once more, this face 140 is provided as part of an independent transducer housing 142. That is, notice that the transducer housing 142 is positioned in a manner removed from contact with the flowline 150 (see spacing 144). As discussed further below, the lack of direct physical coupling between the transducer housing 142 and the tubular structure of the flowline 150 affords the opportunity to attenuate any acoustics generated at the flowline by impacting particulate 135 thereat. As a result, the acoustics ultimately detected may be substantially limited to those generated by particulate 135 impacting the transducer housing 142 (or even just the face 140 as discussed below). Thus, detection of noise from other sources may be largely avoided.

The transducer housing 142 of FIG. 1B is shown secured to the flowline 150 at the indicated location by a package housing 149 which may accommodate added components as described further below. However, in continuing with FIG. 1B here, the physical disassociation of the transducer housing 142 from the flowline 150 as discussed above is achieved through the intermediate presence of the package housing 149. So, for example, seal locations 146, 147 at interfaces between the structure of the flowline 150 and the package housing 149 and between this housing 149 and the transducer housing 142 are presented. As a result, robust, erosion resistant, polymeric seals at such locations may prevent the transmission of acoustic vibrations at the flowline 150 from reaching the transducer housing 142. This may be particularly beneficial where the monitor assembly 100 is available for use topside with surface equipment where O-ring seals may be rated for general use.

Figure 2:
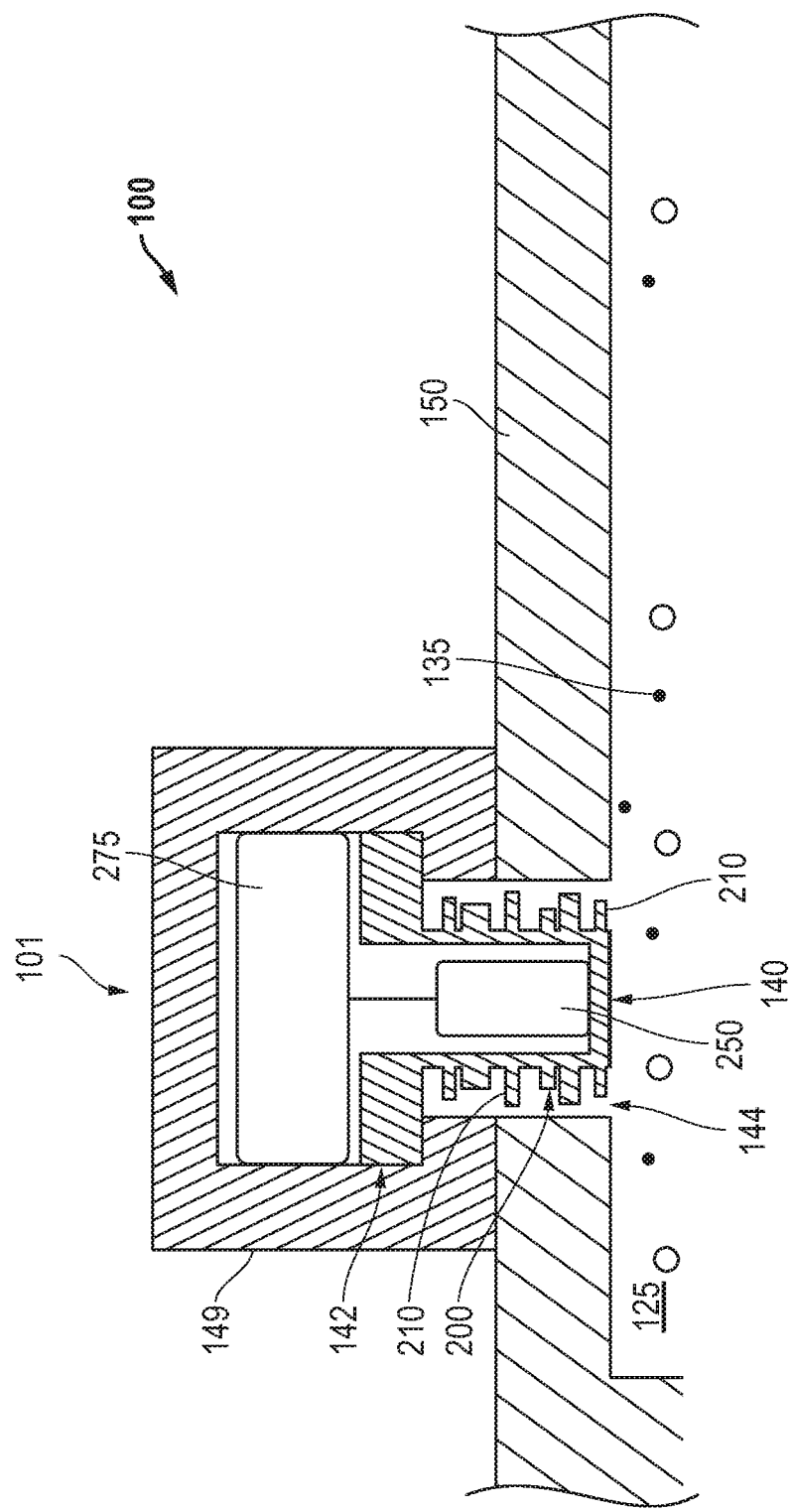
FIG. 2 is an enlarged detailed view of the target detector location of the monitor as depicted in FIG. 1B, illustrating detector components.

Referring now to FIG. 2, an enlarged detailed view of the target detector location of the monitor 100 as depicted in FIG. 1B is shown illustrating detector components. Specifically, the transducer housing 142 may contain a transducer 250 and electronics packaging 275 for management of acoustic data detected by the transducer 250. In one embodiment, the transducer 250 may be tuned for operating at frequencies likely aligned with acoustics of expected particle impacts such as between about 100 kHz and 1 MHz, and/or more narrowly between about 20 and about 30 kHz. However, these particular ranges are not required.

Notice that the transducer 250 is in direct contact with the face 140 for detection of particulate 135 which impacts the face 140. In an embodiment employing conventional polymeric attenuating seals at interface locations 146, 147, the isolation of the transducer housing 142 by way of the separation 144 may be sufficient to substantially eliminate noise which is not acoustics from particulate 135 impacting the face 140 (see FIG. 1B). However, in the illustrated embodiment, alternative measures may be taken.

In the embodiment of FIG. 2, conventional polymeric seals may not be employed or may not be viewed as effective for long term attenuation of acoustic noise. For example, the particulate monitor 100 may be configured for subsea use where such seals are prone to fail over the long term. In such circumstances, metal seals incapable of such acoustic attenuation may be utilized. Whatever the reason, in the illustrated embodiment, the transducer housing 142 is instead (or additionally) equipped with an attenuation profile 200 at its outer surface. Specifically, attenuating ribs 210 are provided. Depending on operational parameters, a variety of different rib numbers may be utilized, including the use of a single rib 210. The exact number, profile and size of each rib 210 may be determined through modeling and experimental verification, accounting for factors such as frequencies to be expected and the dimensions and architecture of the surrounding hardware as well as the materials utilized.

Recall that the transducer 250 is in direct contact with the face 140 of the housing 142. Thus, any acoustic noise that is prevented from reaching the face 140 is advantageously filtered out and unaccounted for, e.g. by a processor of the packaging 275. Such is the case with particulate 135 of the fluid 125 which impacts the flowline 150 outside of the strategically targeted location of the transducer housing face 140. Specifically, such acoustic noise from the structure of the flowline 150 may propagate through the assembly 100 to some extent. However, upon reaching the attenuation profile 200 and individual ribs 210, this noise will be sufficiently attenuated. As a result, this noise substantially fails to reach the transducer 250, thereby enhancing accuracy of the particulate detection as suggested above.

The transducer 250 illustrated in FIG. 2 may be of a piezoelectric acoustic variety suitable for use in an oilfield environment. Once more, the transducer housing 142 and face 140 thereof may be particularly erosion resistant, perhaps more so than conventional steel or other material construction, for example, of the flowline 150. This may include employing ceramic materials, alloys incorporating ceramics, cemented carbide, cermet, boride, carbide, nitride and/or a metal selected from a group IV, V and/or VI metal. In one embodiment, the material is of a single or poly-crystal structure such as diamond or sapphire.

Continuing with reference to FIG. 2, the electronics packaging 275 may be isolated within a dedicated pressure barrier of the package housing 149. It may also further include a processor as suggested above. The processor may be programmed to derive values representative of particulate properties based on the detected acoustic signal. These properties may include particulate concentration, mass and/or flowrate. This information may be managed alone or processed in conjunction with information obtained from sensors at different locations or from sensors of different types (e.g. pressure, temperature or even flowrate obtained from the multiphase flowmeter supported by the restriction 110 of FIG. 1A). Additionally, the processor may employ added filtering beyond that of the acoustic noise filtering and attenuating described above. For example, one or more analogue or digital filters may be incorporated into software or firmware to tailor the types of acoustic readings which are utilized in developing a particulate detection profile.

Figure 3:
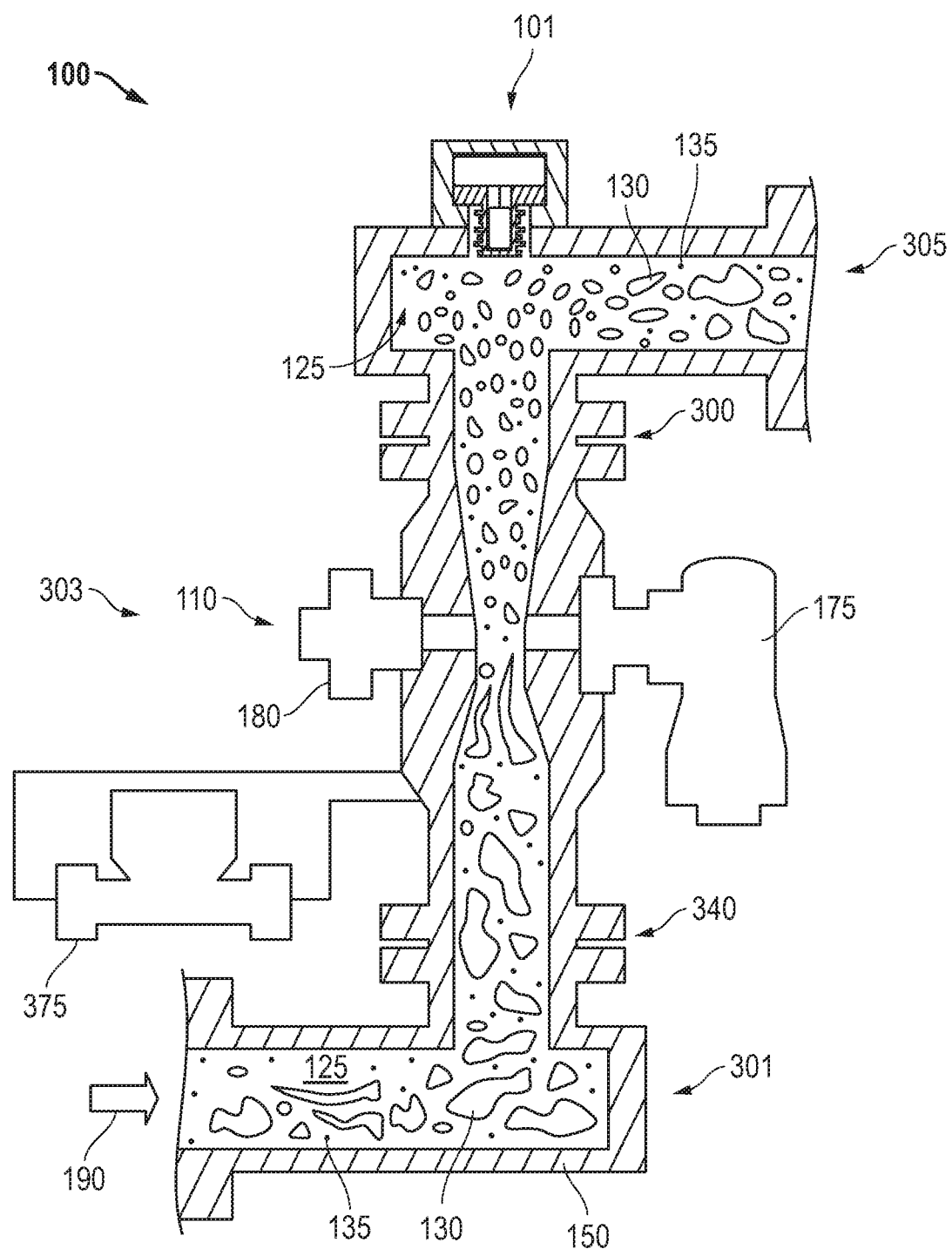
FIG. 3 is an enlarged schematic view of the oilfield production particulate monitor of FIG. 1 with the detector components and surrounding hardware.

Referring now to FIG. 3, an enlarged schematic view of the oilfield production particulate monitor 100 of FIG. 1 is shown with the detector 101 and internal components thereof and surrounding hardware. In this view, the modular nature of the overall monitor assembly 100 is apparent. Specifically, a restriction region 303 is shown secured to a flowline segment 301 from a production line 440 as shown in FIG. 4 at a joint 340. This restriction region 303 includes the flowline restriction 110 detailed above. Again, in the embodiment shown, the restriction 110 is provided in the form of multi-phase flowmeter components 175, 180, 375 adjacent a venturi-shaped portion of the flowline 150. In this illustration, a pressure monitoring device 375 is depicted in addition to the emitter 180 and detector 175 components as is generally the case for such a flowmeter. Regardless, in addition to ascertaining flow rate, the multi-phase fluid 125, including gas 130 and particulate 135 constituents are largely and advantageously homogenized as the flow 190 continues past this area. Of course, a flow nozzle, orifice plate and a host of other types of restrictions may also be utilized.

Continuing with reference to FIG. 3, with added reference to FIG. 4, another joint 300 is depicted where the restriction region 303 is coupled to a detector segment 305 of the monitor assembly 100. The detector segment 305 accommodates the uniquely located and focused detector 101 as detailed above and provides a fluid coupling return to the production line 440. Indeed, the overall modular nature of the assembly 100 for positioning as a unit in line with a production line 440 is readily apparent with reference to FIG. 3.

Referring now to FIG. 4, a perspective overview of a subsea oilfield 400 is shown with a unit 401 housing the production particulate monitor 100 of FIG. 3. Thus, particulate data may be acquired that is uniquely accurate which may be utilized for management of particulate production. In this particular layout, multiple well clusters 425, 435 are shown with various wells 475, 477, 480, 490 for obtaining and routing production fluid. The fluid is generally routed through a production line 440 eventually leading to an offshore platform 460 for collection. An injection line 410 back from the platform 460 is depicted for sake of introducing treatments or other service fluids. Regardless, operations may be directed from the platform 460 and aided by a real time enhanced understanding of produced particulate during production.

As indicated above, a uniquely accurate particulate production monitor 100 of the unit 401 may be utilized to keep track of particulate production in real time and cumulatively over time (see FIG. 3). Thus, depending on the results of such monitoring and operator preferences or predetermined parameters, the production may be managed in any number of ways to deal with accumulating particulate. For example, different separators 450, 475 may be utilized with production routed thereto and/or a particulate cleanout performed at screens thereof as appropriate. Regardless the particular steps, an informed management of the production and particulate may occur due to the improved accuracy in determining the amount and rate of produced particulate.

Figure 5:
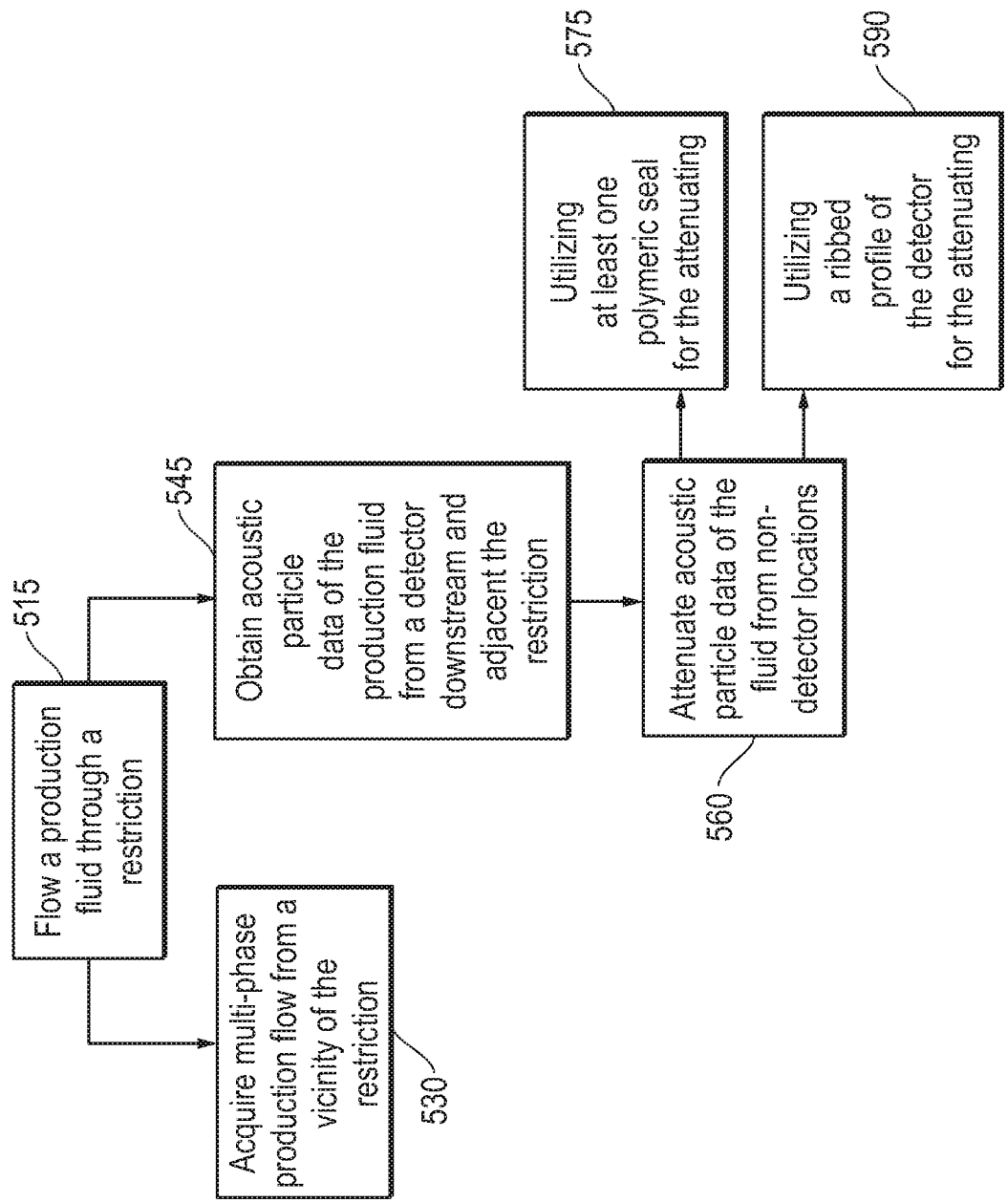
FIG. 5 is a flow-chart summarizing an embodiment of employing a particulate production monitor at an oilfield during production.

Referring now to FIG. 5, a flow-chart summarizing an embodiment of employing a particulate production monitor at an oilfield during production is depicted. As indicated at 515, production fluid is flowed through a restriction. Thus, acquiring multi-phase production flow information at this time may be a strategic option (see 530). Of course, the fluid may not be multi-phase in nature and there is certainly no requirement that such fluid flow information be acquired from the restriction location to ascertain particulate information. However, as indicated at 545, obtaining particulate data from a strategically positioned detector adjacent and downstream of the restriction does provide such particulate information. As detailed above, employing a detector that is strategically positioned in this manner enhances accuracy of the detection given the increased homogenization of the fluid flow at this location.

Of course, further increasing accuracy of particulate detection is of value. Thus, as noted at 560, noise from non-detector locations may be attenuated or filtered out. That is, the embodiments described herein are tailored for particulate detection from a particular detector location as opposed to generally acquiring potential particulate detections from throughout the system. In this regard, the transducer of the detector may be isolated by strategically located polymeric seals for sake of the attenuation as indicated at 575. Additionally, such as in the subsea environment where these types of seals may not be allowed, the transducer may employ a ribbed profile to achieve the sought attenuation (see 590). It should be noted that, where available, such as in topside applications, a combined seal and ribbed profile manner of noise attenuation may be utilized.

Embodiments described hereinabove include a sand and particulate monitor assembly with enhanced accuracy due to the unique architecture employed. Apart from being available in a compact and manageable unit, the assembly includes the unique aspect of a restriction homogenized production flow that is directed at a uniquely positioned detector location. Not only does this improve particulate detection accuracy but detector components may be structurally isolated from the flowline facilitating the production flow. Thus, the opportunity for attenuating noise from the flowline or elsewhere is available. Specifically, polymeric seals, a ribbed transducer profile and/or other measures may be taken to minimize noise and provide a previously unavailable level of particulate detection accuracy.

The preceding description has been presented with reference to presently preferred embodiments. However, other embodiments and/or features of the embodiments disclosed but not detailed hereinabove may be employed. Furthermore, persons skilled in the art and technology to which these embodiments pertain will appreciate that still other alterations and changes in the described structures and methods of operation may be practiced without meaningfully departing from the principle and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A particulate monitoring assembly for subsea use, the particulate monitoring assembly comprising:
a flowline supporting fluid flow through the particulate monitoring assembly, the fluid flow including particulate;
a flow restriction within the flowline to intersect the fluid flow through the assembly;
a detector having a transducer housing and configured to detect a portion of the particulate impacting a face of the transducer housing of the detector, the detector positioned at a location that is adjacent the flow restriction, and the detector having a detector housing that accommodates the transducer housing, wherein the detector comprises a transducer located within the transducer housing;
an attenuating architectural component configured to attenuate acoustical noise from another portion of the particulate impacting a structure of the flowline, wherein the attenuating architectural component comprises a ribbed profile of the transducer housing having at least one rib; and
a metal seal located at an interface between the detector housing and the structure of the flowline;
wherein the transducer housing is isolated from direct mechanical coupling to the structure of the flowline, the transducer housing has a peripheral portion extending to the face, the peripheral portion of the transducer housing extends within an opening in the structure of the flowline, the peripheral portion of the transducer housing is isolated from contact with the structure of the flowline by a fluid region in fluid communication with an interior of the flowline and extending from the peripheral portion of the transducer housing to the structure of the flowline at the opening, and the ribbed profile is formed on the peripheral portion of the transducer housing, such that an entirety of the at least one rib is disposed within the fluid region;
wherein an entirety of the detector housing is positioned outside of the opening in the structure of the flowline, the transducer housing has a base, the peripheral portion of the transducer housing extends from the base, a radial extent of the base is greater than a radial extent of the peripheral portion, the base establishes an axial end of the fluid region, and a portion of the detector housing between the base of the transducer housing and the structure of the flowline bounds a portion of the fluid region; and wherein the detector housing accommodates electronics to obtain acoustic data representing the portion of the particulate impacting the face of the transducer housing from the transducer, and the electronics are positioned within the detector housing on an opposite side of the base of the transducer housing from the portion of the detector housing between the base and the structure of the flowline.

2. The particulate monitoring assembly of claim 1 wherein the face is one of downstream from the restriction, aligned with a central axis of the flowline, or substantially perpendicular to the fluid flow through the assembly.

3. The particulate monitoring assembly of claim 1 wherein the face is constructed of a material that is of greater erosion resistance to the fluid flow than the structure of the flowline.

4. The particulate monitoring assembly of claim 1 wherein the transducer is physically coupled to the face to facilitate the detecting of the portion of the particulate.

5. The particulate monitoring assembly of claim 1 comprising a second metal seal located at an interface between the transducer housing and the detector housing.

6. The particulate monitoring assembly of claim 1, wherein the particulate monitoring assembly does not comprise a polymeric seal.

7. A system for monitoring particulate in a production fluid flow at an oilfield, the system comprising:
   a production line configured to route the production fluid flow from at least one well at the oilfield;
   a monitoring unit coupled to the production line and configured to route the production fluid flow through a restriction in a flowline to a detector adjacently downstream thereof, the detector having a transducer disposed in a transducer housing to detect particulate impacting a face of the transducer housing, the transducer housing having a ribbed profile for attenuating acoustics from sources not impacting the face, the ribbed profile having at least one rib, and the detector having a detector housing that accommodates the transducer housing;
   a first metal seal located at an interface between the detector housing and a structure of the flowline; and
   a second metal seal located at an interface between the detector housing and the transducer housing;
   wherein the transducer housing is isolated from direct mechanical coupling to the structure of the flowline, the transducer housing has a peripheral portion extending to the face, the peripheral portion of the transducer housing extends within an opening in the structure of the flowline, the peripheral portion of the transducer housing is isolated from contact with the structure of the flowline by a fluid region in fluid communication with an interior of the flowline and extending from the peripheral portion of the transducer housing to the structure of the flowline at the opening, and the ribbed profile is formed on the peripheral portion of the transducer housing, such that an entirety of the at least one rib is disposed within the fluid region;
   wherein an entirety of the detector housing is positioned outside of the opening in the structure of the flowline, the transducer housing has a base, the peripheral portion of the transducer housing extends from the base, a radial extent of the base is greater than a radial extent of the peripheral portion, the base establishes an axial end of the fluid region, and a portion of the detector housing between the base of the transducer housing and the structure of the flowline bounds a portion of the fluid region; and
   wherein the detector housing accommodates electronics to obtain acoustic data representing the particulate impacting the face of the transducer housing from the transducer, and the electronics are positioned within the detector housing on an opposite side of the base of the transducer housing from the portion of the detector housing between the base and the structure of the flowline.

8. The system of claim 7 wherein the monitoring unit is a compact modular and manually transportable unit.

9. The system of claim 7 further comprising a separator for extracting the particulate from the fluid flow, the separator managed based on data from the detector.

10. The system of claim 7, wherein the system does not comprise a polymeric seal.

11. A method of monitoring particulate in a production fluid from a well at an oilfield, the method comprising:
   flowing the production fluid through a restriction;
   obtaining acoustic particle data from the production fluid at a detector having a transducer positioned adjacently downstream of the restriction, wherein the transducer is disposed within a transducer housing to detect particulate impacting a face of the transducer housing, and the detector has a detector housing that accommodates the transducer housing;
   attenuating acoustic noise generated at locations apart from the detector during the obtaining, wherein the attenuating comprises employing a ribbed profile of the transducer housing having at least one rib to mitigate detection of acoustics from the locations apart from the detector;
   sealing an interface between the detector housing and a structure of a flowline defining a fluid path for the production fluid flow with a metal seal; and
   sealing an interface between the detector housing and the transducer housing;
   wherein the transducer housing is isolated from direct mechanical coupling to the structure of the flowline, the transducer housing has a peripheral portion extending to the face, the peripheral portion of the transducer housing extends within an opening in the structure of the flowline, the peripheral portion of the transducer housing is isolated from contact with the structure of the flowline by a fluid region in fluid communication with an interior of the flowline and extending from the peripheral portion of the transducer housing to the structure of the flowline at the opening, and the ribbed profile is formed on the peripheral portion of the transducer housing, such that an entirety of the at least one rib is disposed within the fluid region;
   wherein an entirety of the detector housing is positioned outside of the opening in the structure of the flowline, the transducer housing has a base, the peripheral portion of the transducer housing extends from the base, a radial extent of the base is greater than a radial extent of the peripheral portion, the base establishes an axial end of the fluid region, and a portion of the detector housing between the base of the transducer housing and the structure of the flowline bounds a portion of the fluid region; and
   wherein the detector housing accommodates electronics to obtain acoustic data representing the particulate impacting the face of the transducer housing from the transducer, and the electronics are positioned within the detector housing on an opposite side of the base of the transducer housing from the portion of the detector housing between the base and the structure of the flowline.

12. The method of claim 11 further comprising acquiring multi-phase production flow data from the restriction during the flowing of the production fluid therethrough.

13. The method of claim 11 further comprising:
managing the acoustic data with a processor of the electronics; and
adjusting particulate separation parameters of oilfield operations based on the managed acoustic data.

14. The method of claim 13 further comprising tuning the processor to a frequency range of between about 100 kHz and about 1 MHz to filter data in advance of the managing thereof.

15. The method of claim 11, wherein sealing the interface between the detector housing and the transducer housing comprises sealing the interface between the detector housing and the transducer housing with a second metal seal.

* * * * *